June 29, 1954

C. W. VOGT 2,682,206

APPARATUS FOR AND METHOD OF CHAINING ENWRAPMENTS

Filed Oct. 28, 1948

INVENTOR
*Clarence W. Vogt*
BY
*Evans & McCoy*
ATTORNEYS

June 29, 1954  C. W. VOGT  2,682,206
APPARATUS FOR AND METHOD OF CHAINING ENWRAPMENTS
Filed Oct. 28, 1948  6 Sheets-Sheet 2

Fig. 3

INVENTOR
*Clarence W. Vogt*
BY
*Evans & McCoy*
ATTORNEYS

June 29, 1954 C. W. VOGT 2,682,206
APPARATUS FOR AND METHOD OF CHAINING ENWRAPMENTS
Filed Oct. 28, 1948 6 Sheets-Sheet 3

INVENTOR
*Clarence W. Vogt*
BY
*Evans & McCoy*
ATTORNEYS

June 29, 1954  C. W. VOGT  2,682,206
APPARATUS FOR AND METHOD OF CHAINING ENWRAPMENTS
Filed Oct. 28, 1948  6 Sheets-Sheet 5

INVENTOR
Clarence W. Vogt
BY Evans + McCoy
ATTORNEYS

Patented June 29, 1954

2,682,206

UNITED STATES PATENT OFFICE 2,682,206

APPARATUS FOR AND METHOD OF CHAINING ENWRAPMENTS

Clarence W. Vogt, Norwalk, Conn.

Application October 28, 1948, Serial No. 56,941

5 Claims. (Cl. 93—1)

1

This invention relates to enwrapments and in particular to assembling enwrapments into a chain or series.

It is an object of the present invention to provide a method of and apparatus for assembling enwrapments so that such enwrapments may be chained or connected into a series to facilitate their advancement during use, such as for feeding enwrapments to packaging machinery for filling, closing, sealing or carrying out other operations with the enwrapments. It will be apparent that the chaining of enwrapments will simplify and decrease packaging costs since it obviates present methods of manually presenting enwrapments to packaging apparatus or manually placing enwrapments on a conveyor moving to the packaging apparatus.

Another object is to provide a method of and apparatus for assembling enwrapments into a chain in which no separate chaining elements are required, other than those afforded by enwrapments manufactured in accordance with present commercial practices.

A further object is to provide a method of and apparatus for assembling enwrapments in which a chain may be produced such that the individual enwrapments in the chain will be advanced in a diagonal direction. Since the filling nozzles of many presently available packaging machines are mounted for rotation about a vertical axis the presentation of bags to the filling nozzles and the subsequent travel of the bag with the nozzle involves a change in direction of 90°. By the use of a chain which may be fed diagonally, the required change in direction is decreased and it is believed that this will be extremely advantageous, particularly in connection with high speed packaging.

Another object of the present invention is to provide a method of and apparatus for assembling enwrapments into a chain in which the individual enwrapments are detachably secured to one another, the character of the connection being such that individual bags may be readily severed or removed from the chain when it is no longer desired to advance the bags as a part of the chain.

A still further object is to provide a method of and apparatus for assembling enwrapments by adhering the enwrapments to each other to form a chain in which the same adhesive material may be utilized for chaining the enwrapments and subsequently for sealing the filled enwrapments.

Another object is to provide a method of and apparatus for assembling enwrapments into a chain which is adapted to be installed or com-

2 bined with existing bag manufacturing equipment, whereby bag manufacturers may readily, by the use of the present invention, produce chains of bags for sale as an article of commerce.

Other objects and advantages will become apparent from the following detailed description, accompanied by the drawings in which.

In essence, the present invention comprises the formation of chains of enwrapments by advancing such enwrapments in a series, by causing at least portions of adjacent enwrapments to be superposed or overlapped, and by securing the adjacent enwrapments together throughout a part or all of the overlapped portions.

Figures 1, 2:
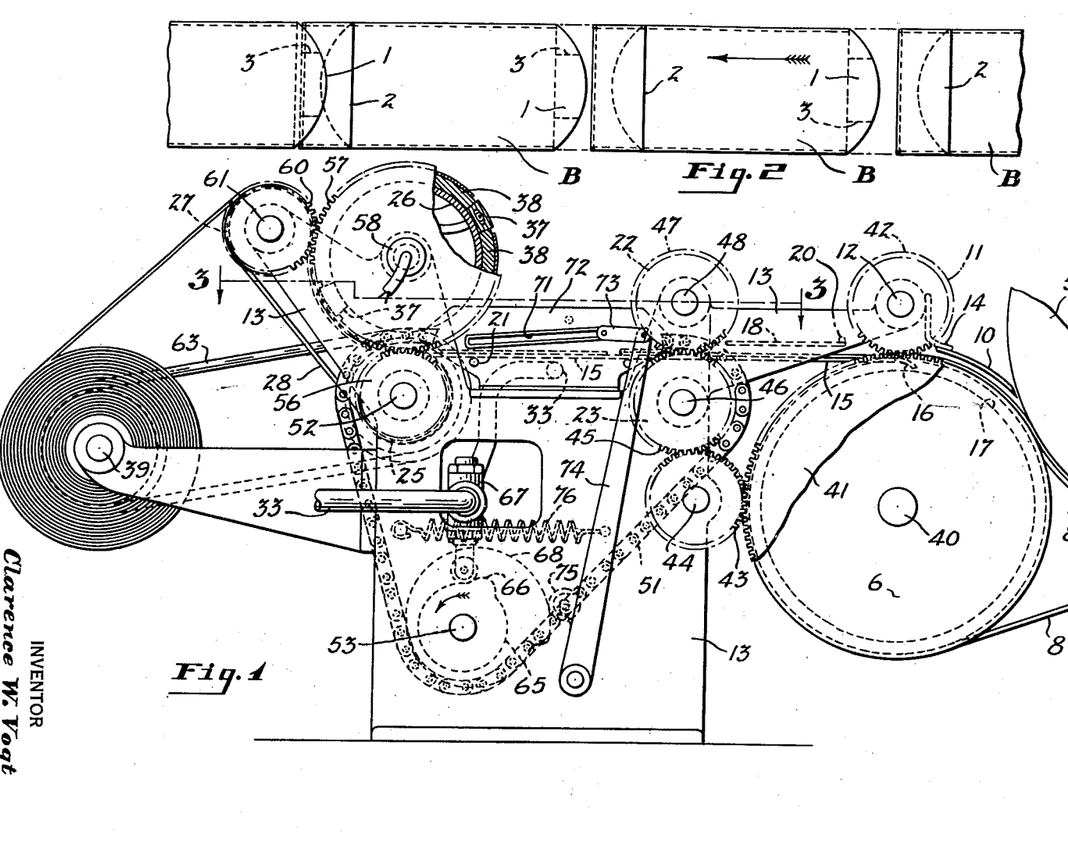
Figure 1 is a side elevation with parts broken away of one form of apparatus embodying the present invention.
Fig. 2 is a plan view of a plurality of enwrapments illustrating how the assembling or chaining may be accomplished in accordance with the present invention.

When looking at Fig. 2, the left hand portion thereof illustrates a fragment of a chain of bags which may be produced in accordance with the present invention. It will be noted that the bags B are of a simple type in which one of the sidewalls extends beyond the other sidewall forming a flap 1 at the mouth of the bag. Bags of this type are manufactured by forming a tubular casing and cutting the casing into desired lengths with the flap 1 being formed by the type of cut made. Any suitable bottom seal may be provided to make a completed bag. The bottom seal may be readily made by folding over a length of the tubular casing upon itself and securing the folded over portion to the bag wall. In Fig. 2 this reversely folded bottom seal portion is indicated by the numeral 2. Since conventional bag making machines produce bags from a continuous tubular casing, the completed bags will be advancing as a spaced series, the spacing between bags being accounted for by the folding over and sealing of the bottom portion of the bag. At this location in the manufacture of the bag, apparatus embodying the present invention may be readily combined with the bag making machinery to provide for the chaining of the bags by causing overlapping of portions of adjacent ones of said bags and securing such overlapped portions together.

Obviously many different chains or connected series of bags may thus be provided without the use of any separate chaining means. Constructions of this type are disclosed in my copending application Serial No. 47,820, entitled Chained Enwrapments, filed September 4, 1948.

One desirale chain is illustrated in Fig. 2 in which the bottom portion of a succeeding bag in the series of spaced bags is overlapped with the top portion of the preceding bag. This is a particularly advantageous construction where the top portion of the preceding bag terminates in a flap 1. Generally such flaps are provided with a suitable adhesive material useful for sealing the bag after it has been filled. The adhesive on the flap may be additionally useful for chaining adjacent bags together to permit advancement thereof to the filling apparatus. When a suitable thermoplastic adhesive material is utilized to coat the flap 1 the chaining may be accomplished by heating all or a portion of the flap to activate the adhesive to a tacky condition and adhering an overlapping portion of an adjacent bag thereto. The adhesive area which may be used to connect adjacent bags into the chain is indicated in Fig. 2 by the numeral 3.

Figure 3:
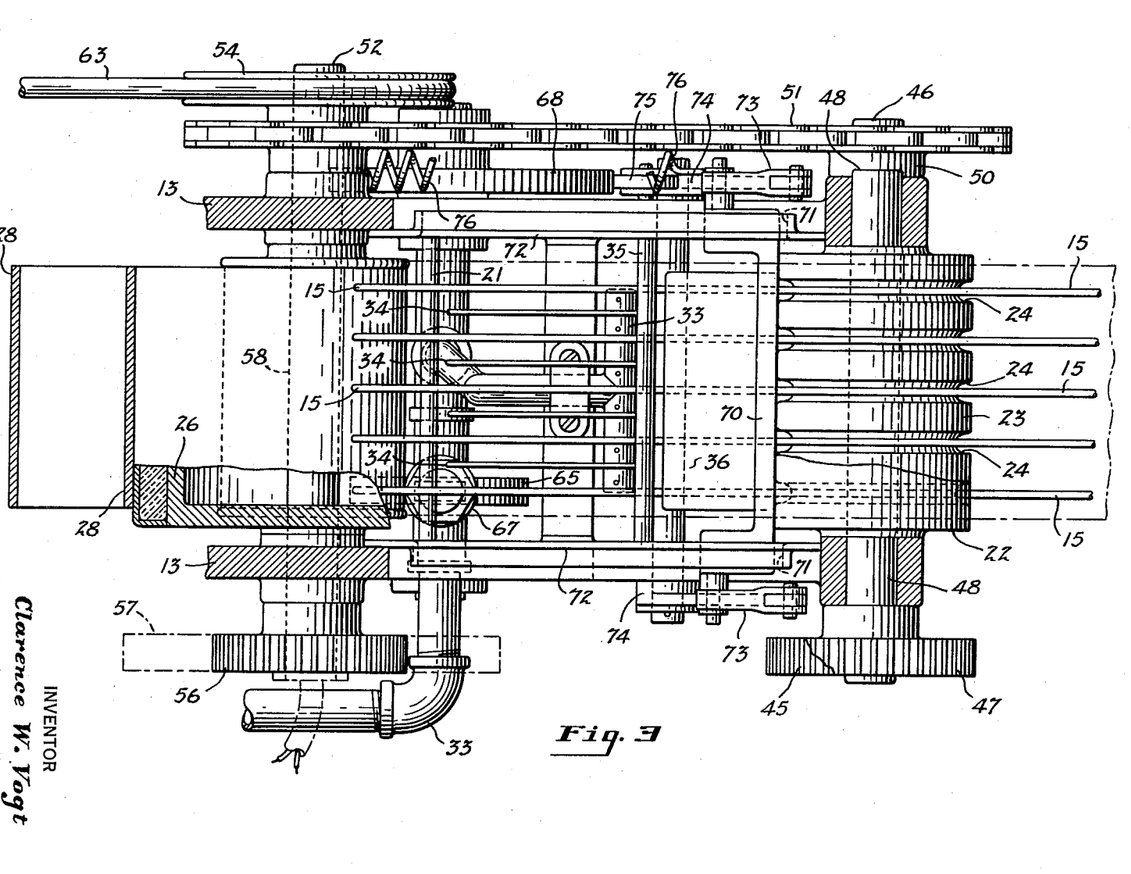
Fig. 3 is an enlarged plan view of a portion of the apparatus taken substantially on line 3—3 of Fig. 1 with parts broken away to illustrate details of the construction.

To accomplish the chaining it is only necessary to attach to existing bag making machines, apparatus embodying the present invention which will cause adjacent bags to be overlapped and connected together. For example, Figs. 1 and 3 illustrate the attachment of suitable apparatus at a point in the bag making machinery where completed bags are being advanced in a spaced series. Numeral 5 indicates a portion of a roller which may be the forwarding roller to advance completed bags from the bottom clinching or creasing drum to the delivery drum of a conventional bag making machine. A roller 6 is positioned adjacent the roller 5 and acts as a pulley for an endless tape or belt 8 which is entrained around the pulley 6 and also engages the periphery of the roller 5. The roller 6 and and the endless belt or tape 8 may be driven by any suitable mechanism (not shown). Preferably the driving mechanism is connected to or synchronized with the driving mechanism for the bag making machinery.

The bags are fed adjacent the periphery of the roller 5 as they leave the bottom creasing drum (not shown) and are transferred and held against the roller 5 by the belt or tape 8. After traveling around the periphery of the roller 5 the bags would normally be transferred to a delivery drum which grips each bag and deposits it in a stack from which it may be removed for packaging. It is at this point that apparatus embodying the present invention may be applied. The delivery drum may be removed from the machine and the apparatus shown in Figs. 1 and 3 substituted therefor.

The bags as they leave the forwarding roll 5 are guided by a plurality of spaced fingers 10 disposed adjacent the rolls 5 and 6, and extending from the location of a feed roll 11 the periphery of which engages the periphery of the feed roll 6 (Fig. 1). The feed roll 11 is mounted for rotation on a shaft 12, journaled at its ends in side frame members 13, which side frames support the apparatus of the present invention adjacent the bag making machinery. The guide fingers 10 may be carried by a support member 14 extending between and secured to the side frames 13.

The feed rolls 6 and 11 advance the bags onto a supporting surface or table which as may be seen in Fig. 3 comprises a plurality of spaced rods or wires 15 suitably supported between the side frames 13. Preferably the rods 15 terminate in a plurality of downwardly extending end portions 16 which extend into recesses 17 in the roller 6 so that the bags are supported by the rods 15 as soon as they pass through the point of engagement between the rolls 6 and 11 (Fig. 1). To guide and maintain the bags on the supporting rods 15 guide wires 18 may be mounted at a spaced location above the rods, such guide wires being carried by a transverse support 20 secured at its ends into the side frames. The rods 15 may be mounted on and carried by transverse supporting elements 21 mounted on the side frames 13.

As the bags move along the surface afforded by the rods 15 they are contacted by a second pair of feed rolls 22 and 23 to insure positive advancement at the desired speed. The feed roll 23 is provided with a plurality of spaced slots or recesses 24 to permit the passage therethrough of the rods 15. The bags are advanced past the feed rolls 22 and 23 and next engage an endless belt 28, carried by a driven roll 25, and a roller or drum 26. At another point on the periphery of the drum 26, a roll 27 is provided similar to the roll 25. Entrained around the rolls 25 and 27 and in engagement with the periphery of the drum 26 therebetween is the endless belt 28 which serves to retain the series or chain of bags against the periphery of the drum 26.

To accomplish the overlapping of adjacent bags in the series the drum 26 and rolls 25 and 27 which drive the belt 28 may be driven at a different speed from the rolls which previously engage and advance the series of bags. Also, the point of engagement of the drum 26 and belt 28 with the bags is spaced from the point of engagement of the feed rolls 22 and 23 a distance equal to or preferably slightly less than the length of the individual bags in the series. Thus, while the bags are in engagement with the feed rolls 22 and 23 they are advanced at one speed and as they end their engagement with these feed rolls and commence engagement with the belt 28 and drum 26 they are advanced at a different and slower speed.

Figure 4:
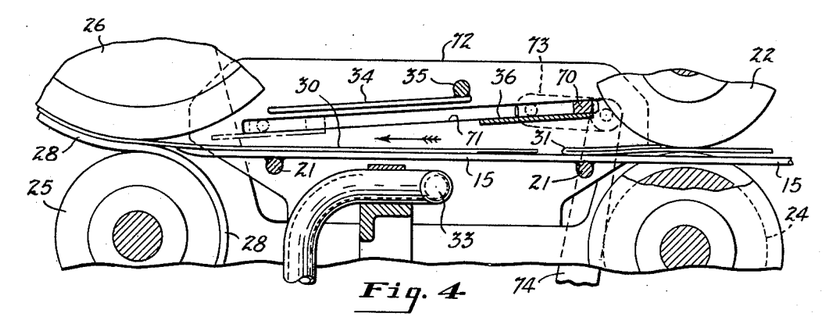
Fig. 4 is an enlarged fragmentary sectional view of a portion of the apparatus shown in Figure 1.
Figure 5:
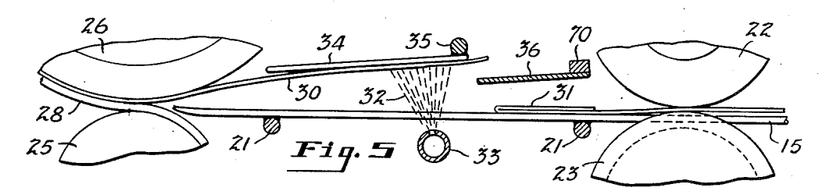
Figs. 5, 6, and 7 are semi-diagrammatic views similar to Fig. 4 to illustrate the sequence of operations performed by the apparatus.
Figure 6:
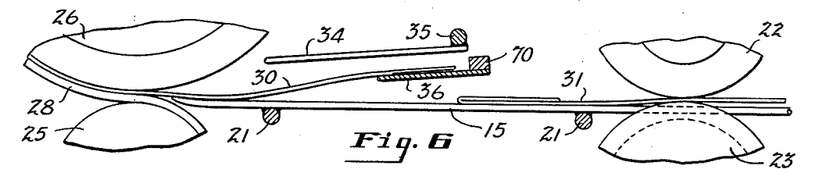
Figure 7:
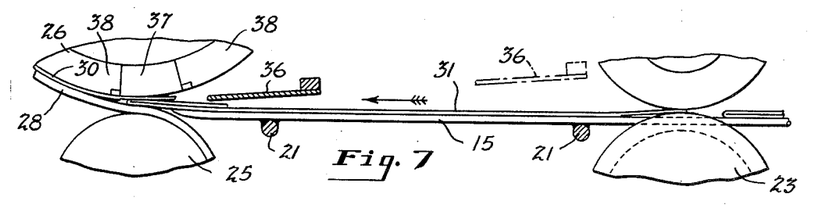

In the interval between the two sets of feed mechanisms overlapping of adjacent bags occurs. To facilitate the overlapping and keep it uniform for each pair of adjacent bags additional mechanism may be provided as is illustrated in Fig. 4. In this figure the preceding bag indicated by the numeral 30 has commenced its engagement with the belt 28 and the drum 26 and is moving at the slower speed. The succeeding bag 31 is in engagement with the feed rolls 22 and 23 and is moving at a faster speed than the bag 30. As the free end of the preceding bag 30 passes along the rods 15 between the two sets of feed mechanisms it is lifted by an air jet indicated by the numeral 32 (see Fig. 5) emanating from air supply pipe 33. To control the amount of lifting of the free end of the bag 30, guide rods 34 supported by transverse rod 35 may be provided. As the free end of the bag 30 is lifted against the guide rods 34 a reciprocating shelf 36 moves beneath the free end of the bag 30 to support the same and carry it forward (see Figs. 5 and 6). During further movement of the bag 30 the shelf 36 travels with it to support it at a spaced distance above the rods 15. Meanwhile, the succeeding bag 31 is advancing due to its engagement with the feed rolls 22 and 23 at the higher rate of speed and as may be seen from Figs. 6 and 7 the leading end of the bag 31 catches up and passes under the free trailing end of the bag 30.

As these overlapping portions of the bags 30 and 31 approach the point of engagement of the belt 28 and the drum 26 the reciprocating shelf 36 reverses its position and withdraws, permitting the trailing edge of the bag 30 to be superposed upon the leading edge of the bag 31. The overlapped portions of the bags are then caught or engaged by the belt 28 and the drum 26 and held against movement with respect to each other (see Fig. 7). The drum 26 is provided with heated segments or sections 37 with intervening insulated sections 38. The heated sections 37 are disposed about the periphery of the drum such that they will fall in register with the overlapped portions of the bags to heat such overlapped portions and activate a thermoplastic adhesive material disposed on one or both of the overlapped portions causing adherence therebetween. As the heated overlapped portions pass between the belt 28 and the drum 26 these portions are securely pressed together to facilitate the connection. After leaving the belt 28 the chained bags may be fed to a driven shaft 39 and rolled or coiled into a roll. In this condition they may be sold as an article of commerce or transferred to another location for use.

The drive for the apparatus may originate from the bag making machinery and synchronization with the bag making machine will be assured. For purposes of illustration it has been assumed that the shaft 40 on which roller 6 is mounted is driven in operative relation to the balance of the bag making machine. The shaft 40 may carry a gear 41 which meshes with a gear 42 mounted on shaft 12 which shaft also carries the feed roll 11 (see Fig. 1). Gear 41 also meshes with and drives gear 43 carried by an idler shaft 44 journaled in the side frame 13. The gear 43 in turn meshes with a gear 45 carried by shaft 46 which also carries the feed roll 23. Gear 45 meshes with a gear 47 carried by a shaft 48 which also has mounted thereon the feed roll 22. Since the roll 6 and the feed rolls 11, 22 and 23 are all geared together and geared to the bag making machinery it will be seen that bags are advanced along the surface afforded by the rods 15 at the same speed as that with which they leave the bag making machine.

The shaft 46 carries a sprocket 50 on which is mounted a chain 51 which chain drives a shaft 52 and a second shaft 53. The shaft 52 is the shaft carrying the roller 25 on which the endless belt 28 is mounted and in addition carries a gear 56 which meshes with a gear 57 carried by a shaft 58 journaled in the side frames. The shaft 58 has mounted thereon for rotation the drum 26. The gear 57 is also in mesh with a gear 60 mounted for rotation on shaft 61 which shaft also carries the roller 27 and the endless belt 28.

Shaft 52 also carries a pulley 54 on which is mounted a belt 63 which drives through another pulley the shaft 39 about which the roll of chained enwrapments is wound (see Figs. 1 and 3). Preferably the connection between the driving belt 63 and the shaft 39 includes a slipclutch to compensate for the varying peripheral speeds of the roll of chained enwrapments since this roll will increase in diameter as the chain of bags is wound thereon. This may also be taken care of by driving the shaft 39 with a belt 63 having a loose connection with the pulley on the shaft 39 so that the belt may slip with respect thereto.

The shaft 53 driven by the chain 51 is provided with a cam 65 having a projection 66 thereon to intermittently actuate a poppet valve 67 which controls the air jet flowing through the supply pipe 33 from any suitable source (not shown). Shaft 53 is also provided with a second cam 68 to actuate the drive of the reciprocating shelf 36. The reciprocating shelf 36 is carried by a slide member 70 (Fig. 3) which extends across between the side frames with portions slidably mounted in a slot 71 in a pair of side guide members 72. The slide member 70 is pivotally mounted to a pair of connecting links 73 which in turn are pivotally mounted on oscillating arms or levers 74. One of the levers 74 is provided with a follower roller 75 which engages the peripheral surface of the cam 68 so that as the shaft 53 is driven rotating the cam 68 the lever 74 oscillates and reciprocates the shelf 36 along the slot 71. A coil spring 76 is secured to one of the levers 74 and to the side frame to urge the lever 74 so that the follower roller 75 will maintain contact with the cam 68 (Fig. 1).

As has been stated, the bags when advanced by the feed rolls 22 and 23 move at one lineal speed and when advanced by the belt 28 and the drum 26, are advanced at a different and slower speed. Since in the form of the invention illustrated in the drawings, the driving mechanisms for the belt 28, drum 26 and feed rolls 22 and 23 are all interconnected and will rotate at the same number of revolutions per minute, the decreased speed of the belt 28 and drum 26 may be obtained by decreasing the diameter of the rolls 25 and 27 which drive the belt 28. Since the rolls 25 and 27 will have less circumference than the rolls 22 and 23, their peripheral speed and the lineal speed at which the belt 28 and drum 26 advance the bags will be less than the speed at which the rolls 22 and 23 advance the bags although their rotary speeds are the same.

It may be seen that the apparatus illustrated in Figs. 1 through 7, as previously described, will be particularly advantageous for forming a chain or connected series of bags in which the mouth portion of each bag is secured to the bottom portion of the next succeeding bag in the chain, and when such bags are wound or coiled into a supply roll they may be later withdrawn by unwinding the roll. In this condition the mouth ends of each of the bags in the chain will be unwound first from the roll in position so that they may be advanced to the packaging machinery. At any given point in the packaging operation when it is desired to remove the leading bag from the chain, this may be readily done by heating the thermoplastic adhesive material by which the bags are chained and it is then simple to peel or slip such bag from its connection with the adjacent bag.

While the drawings illustrate the chain as being formed by adhering the bottom portion of one bag to the closing flap of the adjacent bag, it will be understood that many other connections may be desirable. For example, other portions of the bags may be overlapped and secured together in any of various suitable ways.

Figs. 8 through 12 disclose a modified form of apparatus embodying the present invention to assemble enwrapments to provide a chain which may be fed along a line passing diagonally through each of the enwrapments. The completed chain may be seen in Figs. 8 and 9 and it will be noted that one lower edge portion of a bag is overlapped with and secured to an opposite upper edge portion of the adjacent bag with the mouths of all of the bags disposed in the same direction whereby they may be successively presented to a filling nozzle. In this instance also the apparatus is shown as adapted to receive the bags in the condition in which they are advanced by a bag making machine near the delivery end thereof. As previously illustrated this comprises a spaced series of completed bags.

Figures 8, 9:
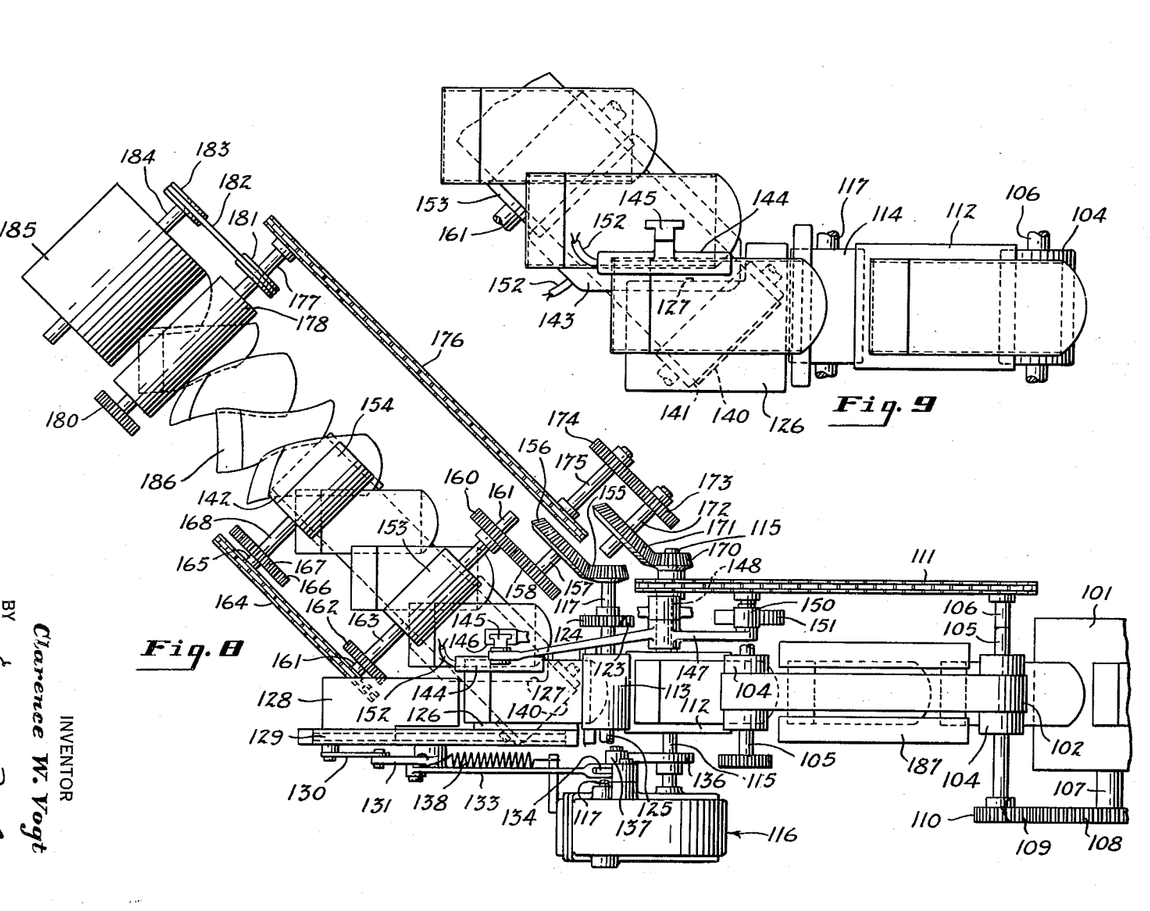
Fig. 8 is a plan view in semi-diagrammatic form of a modified form of apparatus embodying the present invention.
Fig. 9 is an enlarged plan view of a portion of the apparatus shown in Fig. 8.
Figures 10, 11:
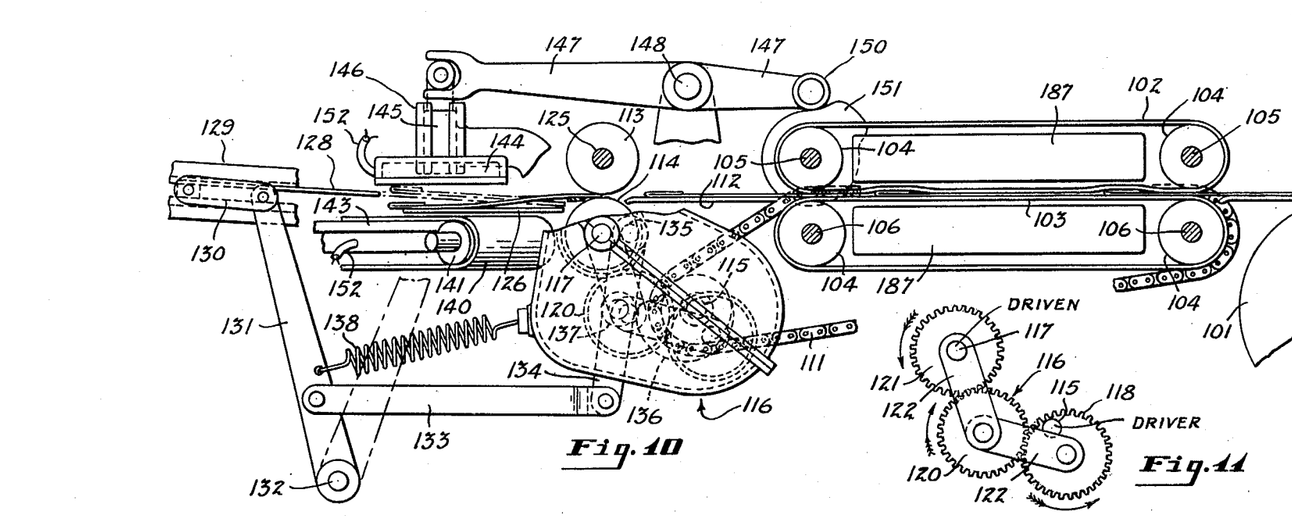
Fig. 10 is an enlarged side elevational view of a portion of the apparatus shown in Fig. 8 to illustrate the operation thereof.
Fig. 11 is an enlarged fragmentary view of a gear train used in driving portions of the apparatus shown in Figs. 8 through 12.

Figs. 8 and 10 illustrate a drum or roll 101 which may be a portion of a conventional bag making machine and advances individual members of the spaced series of bags into a conveyor afforded by a pair of belts 102 and 103 which travel around pulleys or rollers 104. The rollers 104 for the upper belt 102 are mounted for rotation on shafts 105 and the rollers 104 for the lower belt 103 are mounted on shafts 106. As may be seen in Fig. 8 the drum 101 is mounted for rotation on a shaft 107 and the shaft 107 carries a gear 108 which meshes with and drives a gear 109 through an idler (not shown). The gear 109 is mounted for rotation on the leading one of the shafts 106 and meshes with and drives a gear 110 carried by the shaft 105 which is mounted above the shaft 106 and carries roller 104 (see Fig. 8). At its opposite end the shaft 106 carries a sprocket which drives a chain 111, the chain 111 being entrained around a sprocket on the other one of the shafts 106. Since the endless belts 102 and 103 are geared to and driven by the drum 101 it will be seen that they will advance the series of bags at the same peripheral speed as they are advanced by the bag making machine.

As the bags leave the belts 102 and 103 they are fed across a supporting table 112 and through a pair of feed rolls 113 and 114. The chain 111 drives these feed rolls 113 and 114 through an intervening mechanism which modifies the rotational cycle of these feed rolls. The chain 111 passes over a sprocket and drives intermediate shaft 115 (see Fig. 8). The shaft 115 drives a shaft 117 on which the lower feed roll 114 is located through a gear train 116 shown in semi-diagrammatical form in Fig. 11. This gear train 116 comprises a gear 118 eccentrically mounted with respect to the driving shaft 115 and an intermediate gear 120 and a third gear 121 carried by the driven shaft 117. Each of the gears 118 and 121 are pivotally linked to the axis of rotation of the intermediate gear 120 by links 122. The effect of this gear train is to provide an intermittent motion of the driven shaft although the driving shaft is continuously rotated at a constant speed. The driven shaft will rotate at a speed greater than the driving shaft for a portion of its revolution but will also rotate at a very slow speed for a portion of its rotation which in effect constitutes a pause in the rotation of the driven shaft. Such pause amounts to approximately 60° of each complete revolution of the driven shaft.

The driven shaft 117 which carries the lower feed roll 114 is also provided with a gear 123 which meshes with and drives a similar gear 124 mounted for rotation on a shaft 125 which shaft also carries the upper feed roll 113. With this construction the feed rolls 113 and 114 engage bags fed across the table 112 and advance them first with an increased speed and later dwelling so that the bags are stationary for a short portion of the cycle.

It will be noted that the belts 102 and 103 advance the bags at constant speed. The bags then pass across the table 112 and are next engaged by the feed rolls 113 and 114 which as previously described, rotate with a varying speed due to the action of the gear train 116. Accordingly it is preferable that the spacing of the point of engagement between the belts 102 and 103, and the bags, and the point of engagement of the feed rolls 113 and 114 and the bags be a distance approximately equal to or slightly less than the bag length and thus the feed rolls 113 and 114 will commence engagement with the bag just as it is leaving its engagement with the belts 102 and 103.

The feed rolls 113 and 114 advance the bags over a stationary table 126 having a cut out corner portion 127 so that the portion of the bag which is to overlap with the adjacent bag may be exposed to an overlapping position with the bag which has preceded the bag in question.

To prevent interference with bags previously fed over the table 126 and bags being fed by the feed rolls 113 and 114 a reciprocating shelf 128 is provided. This shelf is mounted to slide in a stationary frame or guide member 129 which may be slotted to receive a slide portion of the shelf 128 (see Figs. 8 and 10). To actuate the reciprocating shelf 128 the slide portion thereof is pivotally connected to a link 130 which is in turn pivotally connected to an oscillating lever 131. The oscillating lever 131 oscillates about pivot 132 carried by the frame of the apparatus and is in turn actuated by a link 133 pivotally connected thereto. The link 133 is pivotally connected at its other end to a second oscillating lever 134 which pivots about pivot 135 also fixed with respect to the frame of the apparatus.

The driving shaft 115 for the gear train 116 carries adjacent thereto, a cam 136 (Fig. 8). The periphery of the cam 136 is disposed adjacent a roller follower 137 carried by the oscillating lever 134. A suitable coil spring 138 urges the arm 131 in a direction to maintain the follower 137 of the oscillating lever 134 in contact with the periphery of cam 136. The cam 136 is designed to activate the oscillating levers 131 and 134 and the reciprocating shelf 128 to cause it to occupy its furthermost position toward the right when viewing Fig. 10 as the feed rolls 113 and 114 engage and advance a bag therethrough. The bag is advanced onto the reciprocating shelf 128 and this shelf moves to the left when viewing Fig. 10 as the bag is advanced over the table 126. By the time the bag is leaving the rolls 113 and 114 the next preceding bag has been connected into the chain and advanced from its position on the table 126 and the reciprocating shelf 128 can be withdrawn from the leading edge of the bag permitting it to drop upon the table 126. At this point one lower side edge of the bag overhangs the cut out portion 127 of the table 126 and is overlapped with an upper side edge of the preceding bag. If one of these overlapped portions is provided with a suitable adhesive material the overlapped portions may be adhered together to connect the adjacent bags into a chain.

To carry the chain of bags away from the table 126, a conveyor belt 140 may be provided. The belt 140 passes around a roller 141 disposed beneath the table 126 and also around a roller 142 spaced from the table 126. The line of travel along the conveyor belt 140 may be at any desired angle with respect to the line of travel of the bags through the feed rolls 113 and 114. This angle will depend on the desired angularity of the chain and also on the length and width of the bags being chained.

Figure 12:
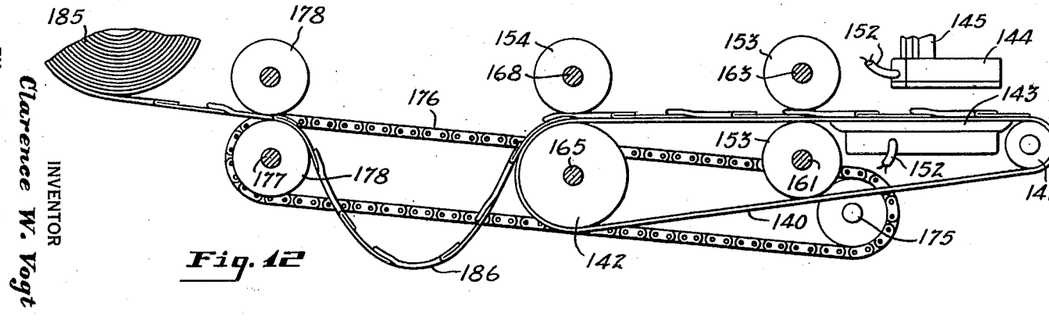
Fig. 12 is an enlarged side elevation similar to Fig. 10 but showing the balance of the apparatus shown in Fig. 8, illustrating details of the operation.

To accomplish the securing of the bags together while in their overlapped position with the preceding bag being disposed on the conveyor belt 140 and the succeeding bag being disposed on the table 126, a backup plate 143 is provided immediately beneath the conveyor belt 140 (see Fig. 12). There is also provided above the overlapped portions of the bags, a movable block 144. The block 144 is provided with a slide member 145 which slides in a guide bracket 146 carried by the frame of the machine. The slide member 145 is pivotally connected to the bifurcated end of a pivotally mounted lever 147 which pivots about a pivot pin 148 carried by the frame of the machine. The pivot pin 148 is disposed between the ends of the lever 147 and the free end of the lever 147 (opposite from its connection to the slide member 145) terminates in a follower portion 150 which is actuated by a cam 151 mounted for rotation on the shaft 105. As the shaft 105 rotates the cam 151 intermittently pivots the lever 147 about pivot in 148, vertically reciprocating the slide member 145 and the block 144 so that the block 144 presses downwardly against the overlapped edge portions of adjacent bags pressing them against the backup plate 143.

Both the backup plate 143 and the block 144 may be heated to activate a thermoplastic adhesive material disposed on the overlapped portions of the bags so that as such overlapped portions are pressed together adherence will be obtained. The heating of the backup plate and the movable block may be accomplished in any desired manner such as by electric resistance heaters embedded in these members. The numeral 152 indicates wires connected to any suitable source of electricity to provide a flow of current through the heater portions of these members. To assist in obtaining a firm adherence between the overlapped portions of adjacent bags, a pair of driven squeeze rolls 153 may be mounted one above and one below the conveyor belt 140. Also, a squeeze roll 154 may be mounted to press against the chained bags while they pass around the periphery of the roller 142 which carries the conveyor belt 140. From the conveyor belt 140 and the roll 154 the chained bags are disposed in a festoon and then may be rolled into a roll for sale as an article of commerce or use.

The conveyor belt 140, squeeze rolls 153 and roll 154 are preferably all driven through the gear train 116 so that they will have the same intermittent motion as the feed rolls 113 and 114. To accomplish this result the driven shaft 117 carries for rotation a bevel gear 155 which meshes with and drives bevel gear 156 carried for rotation by an idler shaft 157. The shaft 157 also carries a gear 158 which meshes with and drives a gear 160 carried by shaft 161. The shaft 161 has mounted thereon the lower of the squeeze rollers 153 and also carries a gear which meshes with and drives gear 162 carried by shaft 163 on which is mounted the uppermost of the squeeze rolls 153. The shaft 161 also carries a sprocket which drives chain 164 entrained around a sprocket mounted for rotation on a shaft 165 which carries the roller 142. Shaft 165 has mounted thereon a gear 166 which meshes with and drives a gear 167 carried by a shaft 168 which also carried the squeeze roll 154. The roller 141 disposed beneath the table 126 which acts as a pulley for the conveyor belt 140 is mounted for free rotation with respect to the frame being driven by the conveyor belt 140 which is in turn driven by the rolls 142 and 154 and the pair of rolls 153.

Since all of the above parts beginning with the feed rolls 113 and 114 and extending through the squeeze roll 154 are driven from the driven shaft 117 of the gear train 116 they will all move with an intermittent motion including a dwell for a portion of their rotary cycle. The mechanism for winding the completed chain, however, should be driven at a constant speed and accordingly it will be seen in Fig. 8 that the windup mechanism is driven from the driving shaft 115. The shaft 115 carries a bevel gear 170 which drives a bevel gear 171 mounted on an idler shaft 172. The idler shaft 172 also carries a gear 173 which meshes with and drives gear 174 carried by a second idler shaft 175. Idler shaft 175 is provided with a sprocket to drive a chain 176 which chain is also entrained around a sprocket carried for rotation by a shaft 177. The shaft 177 carries one of a pair of feed rolls 178, the other feed roll being driven by intermeshing gears 180 (Fig. 8).

The shaft 177 is also provided with a pulley 181 which drives a belt 182 and a second pulley 183, the pulley 183 being carried for rotation by a shaft 184 on which the completed chain of bags may be wound or coiled into a roll indicated by numeral 185 in Figs. 8 and 12. The feed rolls 178 rotating at a constant speed withdraw the bag chain from the festoon indicated by numeral 186 in Fig. 12 and advance it so that it may be wound into a roll. The belt 182 is loosely mounted with respect to the pulleys 181 and 183 to compensate for the change in diameter of the roll 185 as it increases in diameter.

While the drawings show a single heating and backup plate 143 it will be understood that additional backup plates may be provided if necessary to further heat the adhesive material to insure a secure connection between overlapped portions of the bags. The amount of heat and pressure necessary to obtain adequate adherence will depend upon the characteristics of the adhesive material utilized, certain of the thermoplastic adhesive materials now available requiring simultaneous heat and pressure.

It is also contemplated that suitable thermoplastic adhesive material of the type known as "delayed action" adhesive may be utilized. This "delayed action" adhesive means that the adhesive may be activated prior to superposition and adherence of the bags and the adhesive may cool below the activation temperature but will still retain its tacky characteristics. For example, Figs. 8 and 10 illustrate the use of heating elements indicated by the numeral 187 to activate the adhesive as the bags pass along the belts 102 and 103. The heating elements may, for example, be heat lamps radiating sufficient heat through the belts to activate the thermoplastic adhesive on the bags. This would normally be undesirable since the adhesive if activated to its tacky condition would be troublesome to handle while advancing the bags through the belts 102 and 103 and through the feed rolls 113 and 114. However, if the two portions of the bags to be adhered are each given a light coating of a suitable thermoplastic adhesive rather than coating one or the other of the portions with a thicker coating, it has been found that the light coating when activated will not be tacky and will not adhere to anything other than an activated area of a compatible adhesive. Thus, if desired, the adhesive material may be activated prior to superposing of the bags and, if desired, additional heat and pressure may be applied at the time the bags are superposed and adhered.

Figures 13, 14, 15, 16, 17, 18, 19:
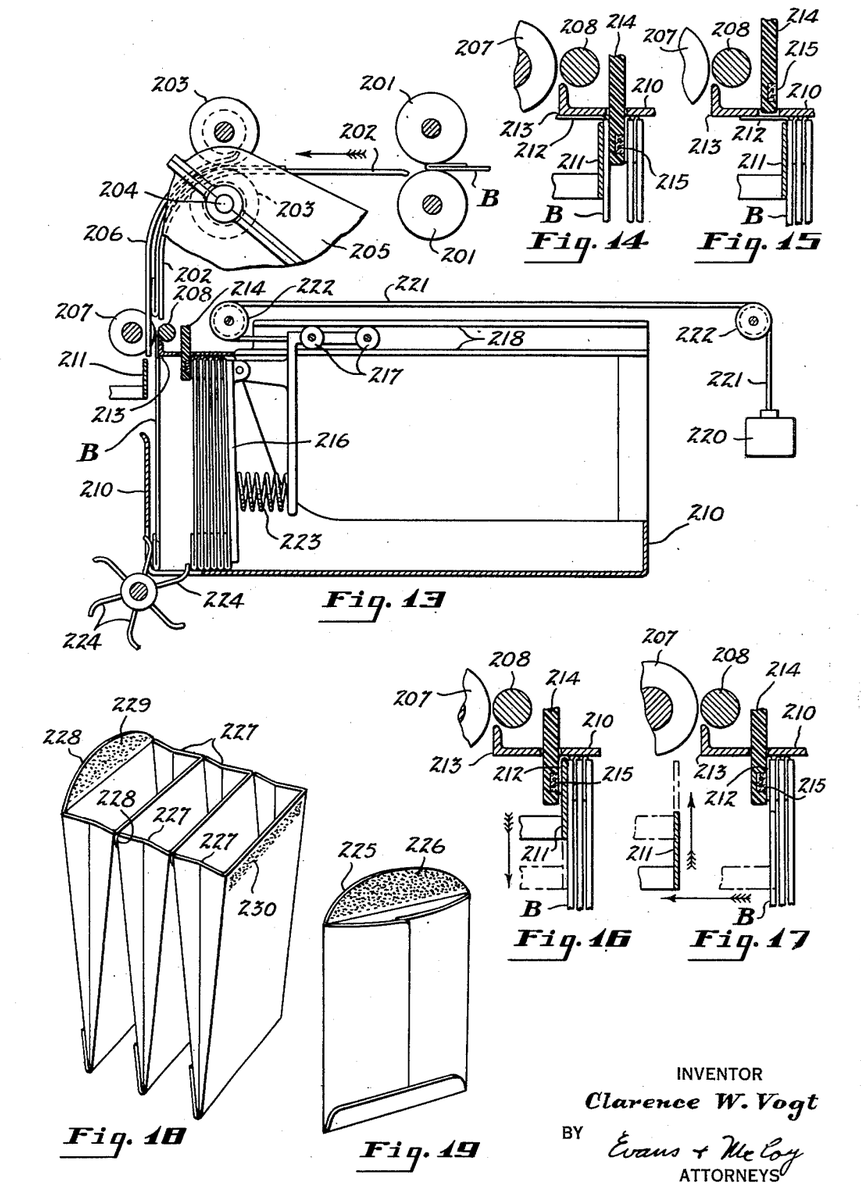
Fig. 13 is a side elevation in semi-diagrammatic form of another modified form of apparatus for assembling enwrapments into a chain which differs from the chains produced in accordance with Figs. 1 through 7, and 8 through 12.
Figs. 14, 15, 16 and 17 are enlarged diagrammatic illustrations of the steps to be followed in producing a chain by the apparatus shown in Fig. 13.
Fig. 18 is a perspective view of a portion of a chain of enwrapments which may be produced in accordance with Figs. 13 through 17.
Fig. 19 is a perspective view of another form of enwrapment or envelope which may be assembled into a chain similar to that shown in Fig. 18 by the apparatus shown in Figs. 13 through 17.

Figs. 13 through 17 illustrate another modified form of apparatus which may be used to carry out the present invention. In this form of the invention a series of enwrapments may be supplied to the apparatus either from a bag making machine or from any other suitable source. Fig. 13 shows a pair of feed rolls 201 which may be driven in any suitable manner not shown and one of a series of bags B is indicated as just being engaged by the feed rolls 201. These feed rolls 201 may correspond to the upper and lower belts 102 and 103 carried by pulleys 104 as shown in Figs. 8 and 10. From the feed rolls 201 the bags are advanced across a supporting surface which may be formed by a plurality of transversely spaced wires or rods 202. Before parting engagement with the feed rolls 201 the bags commence engagement with a pair of feed rolls 203. The lowermost of these feed rolls 203 may be mounted on and driven by a shaft 204.

In the form of the invention illustrated, the feed rolls 203 and the shaft 204 correspond to the feed rolls 113 and 114 in the form of the invention shown in Figs. 8 through 12 with the shaft 204 corresponding to the shaft 117 which as previously described is the driven shaft of the gear train 116. Thus, the feed rolls 201 may rotate at a constant speed while the feed rolls 203, activated by the shaft 204, may rotate with an intermittent motion including in their cycle a period of dwell and a period of rotation at an increased rotary speed as compared to the feed rolls 201. However, the revolutions per minute of the feed rolls 201 and the feed rolls 203 will be the same and the same number of bags will be advanced by the feed rolls 203 as the feed rolls 201 for a given time period. The numeral 205 in Fig. 13 indicates a portion of a casing for a gear train identical with the gear train indicated by the numeral 116 in Figs. 8, 10 and 11.

After passing through the feed rolls 203 the bags are advanced in a path which veers downwardly as compared to their direction of approach to the feed rolls 203. In this veering downward movement the bags may be guided by extended portions of the wires or rods 202 which pass through grooves in the lower of the feed rolls 203. At the same time the bags are also guided by a plurality of transversely spaced wires or rods 206, the ends of which may be disposed in grooves formed in the uppermost of the feeds rolls 203 to insure control of the bags as they leave the feed rolls 203. The bags next engage and are advanced by an advancing roll 207 which may be driven in any suitable manner (not shown) from the shaft 204. Parallel to the advancing roll 207 is a roll of decreased diameter 208 which may be an idler roll to assist the roll 207 in advancing or holding the bags. The rolls 207 and 208 advance the bags into a box shaped housing or container indicated by the numeral 210 so that their bottoms rest adjacent the bottom of the housing with the balance of the bag extending in an upright position with a portion of the flap at the bag mouth still held in engagement by the rolls 207 and 208. At this point in the operation cycle the pair of rolls 203 and the rolls 207 and 208 due to their being driven through the gear train, a portion of which is indicated by the casing 205, dwell for a time period which may amount to approximately one-sixth of the operation cycle.

During this dwell period, mechanism (which may be driven from a shaft rotating at constant speed similar to the drive for the feed rolls 201) may perform the assembling or combining of the bags into a chain. For example, as soon as a bag is advanced into the housing 210, a pusher 211 contacts the bag along one of its flat side surfaces adjacent the mouth end thereof and advances the bag sideways from its position as shown in Fig. 13 to the position shown in Fig. 14. In so doing the flap indicated by the numeral 212 is bent at right angles to the main portion of the bag by the corner 213 of the housing 210. As illustrated in Fig. 14 the pusher 211 advances the bag until it contacts with a slideably mounted member 214.

The member 214 is provided with a heater element 215 (illustrated as an insert in the slideable member 214) and it may be seen that this element is in engagement with and heating thermoplastic adhesive material disposed on the reversely bent flap of the preceding bag. Next the member 214 withdraws through a slot in the wall of the housing 210 and the pusher member 211 advances the bag further, into contact with the flap of the bag in the series which preceded the bag being advanced by the pusher 211. This position is illustrated in Fig. 15 and since the heater element 215 in the slideable member 214 has heated and activated the thermoplastic adhesive material on the flap of the preceding bag the abutting face of the bag being advanced by the pusher 211 will adhere thereto and connect the bag into the series or chain. It may be seen that the bags have been brought into overlapping position and portions of adjacent ones are secured together.

The slideable member 214 is next advanced into the housing 210 but on the opposite side of the pusher 211. This causes the flap 212 to be folded reversely against the mouth portion of the bag with the pusher member 211 disposed between the flap and the bag as is clearly illustrated in Fig. 16. At this point in the cycle the heater element 215 comes into contact with the flap 212 of the bag which is just being chained and commences to heat the thermoplastic adhesive material disposed thereon. Figs. 16 and 17 illustrate the subsequent motions of the pusher 211 which withdraws downwardly from between the flap and the bag and moves outwardly and upwardly to its initial position shown in Fig. 13 where it is then ready to contact and advance the next bag. The dwell portion of the cycle of the rolls 203 and the rolls 207 and 208 terminates and these rolls commence feeding another bag downwardly into the housing 210.

The bags which have been chained as shown in Fig. 13 are held in position by a backup plate 216 which is mounted on wheels 217 freely rotatable along a track 218 and urged to compact condition by a weight 220 secured to the backup plate by a line or cord 221 which is disposed around pulleys 222. If desired, the backup plate 216 may be pivotally mounted near its top, and the bottom portion may be urged outwardly by a spring 223 to compensate for the differences in bulk between the bottom and top of the bags when disposed in the chain. Such difference may arise due to a difference in the thickness between the bottom seal of the bag and the top portion of the bag.

The bottom portions of the bags being fed into the housing 210 may be advanced into the position where the bags are chained by a driven rotary wheel having generally radial flange members or paddles 224. The members 224 may be driven in synchronization with the pusher 211 so that the bag bottoms are contacted and advanced at the same speed as the top portions thereof are advanced by the pusher 211.

Figs. 13 through 17 illustrate the formation of a chain of bags from the type of bag shown in Fig. 2 having a flap at the mouth with adhesive coated portions thereon. Fig. 19 illustrates an envelope type of enwrapment similar to the bags shown in Fig. 2 and having a flap 225. The envelope in Fig. 19 differs from the bag in Fig. 2 in their method of formation. The envelope is formed by cutting or dieing blanks having a body portion and side wings or tab portions which are folded upon the body portion and secured together to form a tubing with a bottom seal formed by folding another wing onto the body portion and securing it to the side wings. Obviously these envelopes lend themselves to chaining in the same manner as do the bags shown in Figs. 2 and 13. The flap 225 of the envelope may be provided with a covering of an adhesive material indicated by the numeral 226. This adhesive material is preferably a thermoplastic and by the apparatus shown in Fig. 13 a portion thereof may be activated to facilitate chaining of the bags as has been described. Further, when the envelopes are to be sealed the thermoplastic adhesive material 226 may be heated to activation temperature and the flap 225 folded over onto the body of the envelope to seal the same. A large number of these envelopes are made for mailing a wide variety of commodities and it will be seen that by the present invention such envelopes may be assembled into a chain so that they may be advanced and the contents automatically placed therein. If relatively narrow transverse areas of the two adjacent envelopes are secured together tension on a leading one of the envelopes in the chain will assist in opening the mouths of the succeeding envelopes to facilitate filling.

Such a principle is illustrated by the portion of a chain of bags shown in Fig. 18. In this instance the bags which have been chained in accordance with the present invention are provided with gussets or infolds indicated by the numeral 227. Such bags may also be provided with flaps 228 at their mouths and such flaps may be coated with a suitable adhesive material indicated by numeral 229. A chain of this type may be readily produced by the apparatus shown in Figs. 13 through 17 and if desired the entire area of the flap 229 may be activated by the heater element 215 to provide a connection along the entire width of the juxtaposed faces of adjacent bags. Due to the presence of the gussets or infolds 227 the bags in the chain may be opened completely so that the chain in plan view presents a succession of fully open bag mouths. Such a construction is particularly advantageous for packaging free-flowing materials by the use of a continuously operated measuring and dispensing filler with the chain passing therebeneath. If the chain and dispensing mechanism are operated at substantially constant speeds a definite amount of the commodity will flow into each of the chained bags and if packaging tolerances will permit, this filling may be accomplished with a great deal less expense than if individual quantities are measured and placed in each bag. It will be noted that due to the chaining of the bags the preceding and succeeding bags in the chain facilitate automatic opening of each bag as it is advanced.

The bags shown in Fig. 18 differ slightly from previously described bags, since in addition to the adhesive coating 229 on the flaps 228 of the bags, the opposite exterior mouth portion of each bag may also be provided with an adhesive area indicated by the numeral 230. This coating is disposed at a position where it will be in register with the adhesive on the flap 228 of an adjacent bag when the bag is in position to be chained as well as when the bag is ready to be sealed with the flap folded over the mouth of the bag. This is of advantage since two relatively thin coatings of compatible adhesive materials may be utilized and when this is done the relatively thin coatings are not tacky when contacted by materials other than a similar coating of activated adhesive. Thus, movement of the slideable member 214 across the adhesive area will not have a tendency to disturb or offset the adhesive coating. When a coating of adhesive is utilized both on the flap and the bag mouth the activation thereof may be accomplished by providing a second heater element 215 in back to back position with the present heater element or the present heater element may be extended through so that it is open to both faces of the slideable member 214.

It will be understood that the housing 210 may be of such length that any desired number of bags may be combined into a chain. Further, predetermined numbers of bags may be chained and the individual chains may be connected together before being advanced to the filling apparatus to permit continuous filling, if desired.

Although the present invention has been illustrated in connection with the assembling of bags and envelopes into a chain or series it will also be understood that it is equally applicable to the assembling of other types of enwrapments or wrappers. By way of example, the chain or series of enwrapments disclosed in Figs. 1 and 2 of my copending application Serial No. 56,942, filed October 28, 1948, and entitled Wrappers, may be readily assembled in accordance with the present invention. The enwrapments may be formed as a continuous strip in a manner similar to that by which gusseted bags are manufactured on present day conventional machinery and individual or multiple enwrapment lengths may be cut from the continuous strip. These cut lengths may then be fed to the apparatus shown in Figs. 8 through 12, with the exception that the conveyor 140 instead of removing the chained enwrapments at an angle of 45° would remove them at an angle of 90° so that the edge portions of adjacent enwrapments may be overlapped and secured together as shown in said copending application.

While the drawings illustrate the present invention as adapted for attachment to existing bag making machines it will be obvious that it is not limited to such use. It may be equally well carried out with any desired means for feeding a plurality of bags to the combining apparatus. However, since most bag machines do, at some point advance completed bags in a spaced series, it is believed efficient to attach apparatus embodying the present invention to such machinery. A bag manufacturer is enabled to produce at the same high speed at which bags can presently be manufactured, rolls of chained bags which may be readily shipped with less packaging problem than is presently incurred with stacks of bags which must, as a practical matter, be boxed for protection. Further, the user is enabled to mount the rolls of chained bags and advance them to packaging machinery automatically. This obviates the presently required manual handling for placing individual bags on a conveyor which advances them to the packaging apparatus or the manual presentation of the bags to the filling apparatus. Since the bags are chained they may be presented to a filling nozzle and automatically opened to permit insertion of contents therein, and may then be automatically handled to close and seal the bags to form completed packages.

It will be obvious that many other variations and modifications from those shown and described for purposes of explanation and illustration may be made without departing from the spirit of the present invention.

What I claim is:

1. Apparatus for assembling enwrapments which comprises a feed mechanism for advancing a series of enwrapments, a second feed mechanism to receive enwrapments from said first feed mechanism, spaced from said first feed mechanism approximately the length of an enwrapment in said series, each of said feed mechanisms having different enwrapment advancing characteristics, means for lifting the trailing portion of an enwrapment being advanced by said second feed mechanism to permit overlapping with a portion of an enwrapment being advanced by said first feed mechanism and means for securing together said overlapped portions of adjacent enwrapments.

2. The method of assembling enwrapments which comprises feeding a plurality of enwrapments disposed in a spaced series, successively decreasing the speed of individual ones of said enwrapments, successively lifting a portion of individual ones of said enwrapments to permit the next adjacent succeeding enwrapment to overlap therewith, and connecting together portions of said overlapped enwrapments in position to permit opening thereof while so connected.

3. Apparatus for assembling enwrapments, which comprises a feed mechanism for advancing a series of enwrapments, a second feed mechanism to receive enwrapments from said first mechanism, each of said feed mechanisms having different enwrapment advancing characteristics, means for lifting the trailing portion of an enwrapment being advanced by said second feed mechanism to permit overlapping with a portion of an enwrapment being advanced by said first feed mechanism, means for maintaining the trailing portion of the enwrapment in lifted position, and means for securing together said overlapped portions of adjacent enwrapments.

4. Apparatus for assembling enwrapments, which comprises a feed mechanism for advancing a series of enwrapments, a second feed mechanism to receive enwrapments from said first mechanism, each of said feed mechanisms having different enwrapment advancing characteristics, means for lifting the trailing portion of an enwrapment being advanced by said second feed mechanism to permit overlapping with a portion of an enwrapment being advanced by said first feed mechanism, means moving with the trailing portion of the enwrapment for maintaining the same in lifted position, and means for securing together said overlapped portions of adjacent enwrapments.

5. Apparatus for assembling enwrapments, which comprises a feed mechanism for advancing a series of enwrapments, a second feed mechanism to receive enwrapments from said first mechanism, each of said feed mechanisms having different enwrapment advancing characteristics, fluid means for lifting the trailing portion of said enwrapment being advanced by said second feed mechanism to permit overlapping with a portion of an enwrapment being advanced by said first feed mechanism, and means for securing together said overlapped portions of adjacent enwrapments.

References Cited in the file of this patent

UNITED STATES PATENTS

| Number | Name | Date |
|---|---|---|
| 1,893,086 | Keller | Jan. 3, 1933 |
| 2,132,227 | Winkler et al. | Oct. 4, 1938 |
| 2,164,436 | Walters | July 4, 1939 |
| 2,232,062 | Gurwick | Feb. 18, 1941 |
| 2,277,924 | Morrison | Mar. 31, 1942 |
| 2,288,360 | Jensen | June 30, 1942 |
| 2,423,237 | Haslacher | July 1, 1947 |